US011727797B2

(12) United States Patent
Zeiynali Farid et al.

(10) Patent No.: US 11,727,797 B2
(45) Date of Patent: Aug. 15, 2023

(54) COMMUNICATING A TRAFFIC CONDITION TO AN UPSTREAM VEHICLE

(71) Applicant: Toyota Motor Engineering & Manufacturing North America, Inc., Plano, TX (US)

(72) Inventors: Yashar Zeiynali Farid, Berkeley, CA (US); Kentaro Oguchi, Mountain View, CA (US); Baik Hoh, Campbell, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 13 days.

(21) Appl. No.: 17/513,053

(22) Filed: Oct. 28, 2021

(65) Prior Publication Data
US 2023/0134612 A1    May 4, 2023

(51) Int. Cl.
*G08G 1/052* (2006.01)
*G06V 20/56* (2022.01)
*G08G 1/017* (2006.01)

(52) U.S. Cl.
CPC ............. *G08G 1/052* (2013.01); *G06V 20/56* (2022.01); *G08G 1/017* (2013.01)

(58) Field of Classification Search
CPC ........ G08G 1/052; G08G 1/017; G08G 1/162; G08G 1/0141; G08G 1/167; G06V 20/56; H04W 4/46
See application file for complete search history.

(56) References Cited

U.S. PATENT DOCUMENTS 6,411,328 B1    6/2002  Franke et al.
8,260,498 B2    9/2012  Deng
(Continued)

FOREIGN PATENT DOCUMENTS

WO    2018132378 A2    7/2018

OTHER PUBLICATIONS

Unknown, "Traffic flow: the Lighthill-Whitham-Richards model" 11 pages, last accessed on Oct. 27, 2021, found at http://www.clawpack.org/riemann_book/html/Traffic_flow.html.

(Continued)

*Primary Examiner* — Sisay Yacob
(74) *Attorney, Agent, or Firm* — Christopher G. Darrow; Darrow Mustafa PC

(57) ABSTRACT

A system for communicating a traffic condition to an upstream vehicle can include a processor, disposed on an ego vehicle, and a memory. The memory can store a determination module and a communications module. The determination module can include instructions that cause the processor to determine, by the ego vehicle in a first lane, an existence of the traffic condition that includes a difference, between an actual velocity of a vehicle in a second lane and an expected velocity, being greater than a threshold. The communications module can include instructions that cause the processor to: (1) cause, in response to the existence, a communications device of the ego vehicle to communicate, to the upstream vehicle, information about the traffic condition and (2) cause, in response to an absence of the existence, the communications device to refrain from communicating, to the upstream vehicle, the information about the traffic condition.

20 Claims, 10 Drawing Sheets

(56) References Cited

U.S. PATENT DOCUMENTS

| | | | |
|---|---|---|---|
| 9,240,123 | B2 | 1/2016 | Stenneth |
| 9,633,560 | B1 | 4/2017 | Gao et al. |
| 9,672,734 | B1 | 6/2017 | Ratnasingam |
| 10,692,365 | B2 | 6/2020 | Ran et al. |
| 10,964,207 | B2 | 3/2021 | Mobasser |
| 2007/0005231 | A1 | 1/2007 | Zhang et al. |
| 2014/0278052 | A1 | 9/2014 | Slavin et al. |
| 2017/0148316 | A1 | 5/2017 | Curlander et al. |
| 2018/0267537 | A1 | 9/2018 | Kroop et al. |
| 2018/0275678 | A1* | 9/2018 | Andert .................... G08G 1/164 |
| 2019/0392712 | A1 | 12/2019 | Ran et al. |
| 2020/0005633 | A1 | 1/2020 | Jin et al. |
| 2020/0166934 | A1* | 5/2020 | Khayatian ............ G08G 1/0112 |
| 2020/0312134 | A1 | 10/2020 | Zhang et al. |
| 2020/0380859 | A1* | 12/2020 | Lofter .................... G06V 20/58 |
| 2021/0065547 | A1 | 3/2021 | Ran et al. |
| 2022/0048513 | A1* | 2/2022 | Xu .................. B60W 60/00274 |

OTHER PUBLICATIONS

Gartner et al., "Traffic Flow Theory: A State-of-the-Art Report," Apr. 13, 2002, 386 pages.

Unknown, "Land guidance wrong," Aug. 24, 2019, 8 pages, found at https://support.google.com/maps/thread/12716/2/landguidancewrong?hl=en.

Unknown, "HERE Lanes," 9 pages, last accessed Aug. 31, 2021, found at https://www.here.com/platform/mapping/lanes.

Unknown, "Lane-level accuracy via fusion and hybridization algorithms for GNSS, IMU, Map and Computer Vision signal," Horizon 2020, 4 pages, found at https://inlane.eu/inlane-solution/architecture/.

Dubbelman et al., "Low Cost GNSS and Computer Vision Fusion for Accurate Lane Level Navigation and Enhanced Automatic Map Generation," 2016, 20 pages.

Willem Strijbosch, "TomTom and inLane: Building Lane-Level Technology for Autonomous Driving," Jul. 19, 2018, 5 pages, found at https://www.linkedin.com/pulse/tomtom-inlane-building-lane-level-technology-driving-strijbosch.

Unknown, "Swift Navigation Demonstrates First-Ever Nationwide Lane-Level Precise Positioning With Ambitious Continental U.S. Drive Test," Swift Navigation, Jun. 9, 2020, 2 pages.

Phate Zhang, "Gaode Map launches lane level navigation, Huawei phones first to be supported," Oct. 31, 2020, 3 pages, found at https://cntechpost.com/2020/10/31/gaode-map-launches-lane-level-navigation-huawei-phones-first-to-be-supported/.

Unknown, "Lanes," 13 pages, last accessed on Aug. 31, 2021, found at https://wazeopedia.waze.com/wiki/USA/Lanes.

Amir Baruch, "Dynamic Lane Level Guidance—What It Is and Why You Should Care," Telenav, Mar. 19, 2019, 4 pages.

Seo et al., "Traffic State Estimation on Highway: A Comprehensive Survey," Journal of Annual Reviews in Control, vol. 43, 2017, pp. 128-151.

Unknown, "Innovative End-of-Queue Warning System Reduces Crashes Up to 45%," Sep. 2015, 2 pages.

Molzahn et al., "Jam Tail Warnings Based on Vehicle Probe Data," Transportation Research Procedia, vol. 27, 2017, pp. 808-815.

Clements et al., "Real-time Safety Alerts for Severe Weather and Jam Tails," Les Rencontres de la Mobilité Intelligente, 2016, pp. 1-8.

Di et al., "A Survey on Autonomous Vehicle Control in the Era of Mixed-Autonomy: From Physics-Based to AI-Guided Driving Policy Learning," Transportation Research Part C, 2021, vol. 125, Apr. 2021, pp. 1-50.

Unknown, "Your Personal Mobility Modeling Lab," Aimsun User Manual, Aimsun Next, last accessed on Oct. 15, 2021, 14 pages, https://www.aimsun.com/aimsun-next/.

Jakob Erdmann, "SUMO's Lane-changing model," Modeling Mobility with Open Data. Lecture Notes in Mobility, Mar. 12, 2015, pp. 105-123.

Treiber et al., "Modeling lane-changing decisions with MOBIL," Traffic and Granular Flow '07, Springer, Berlin, Heidelberg, pp. 211-221.

Brandon Russell, "Waze is getting lane guidance, trip suggestions, and traffic notifications," Sep. 15, 2020, 9 pages, found at https://www.xda-developers.com/waze-adds-lane-guidance-trip-suggestions-traffic-notifications/.

\* cited by examiner

First Time

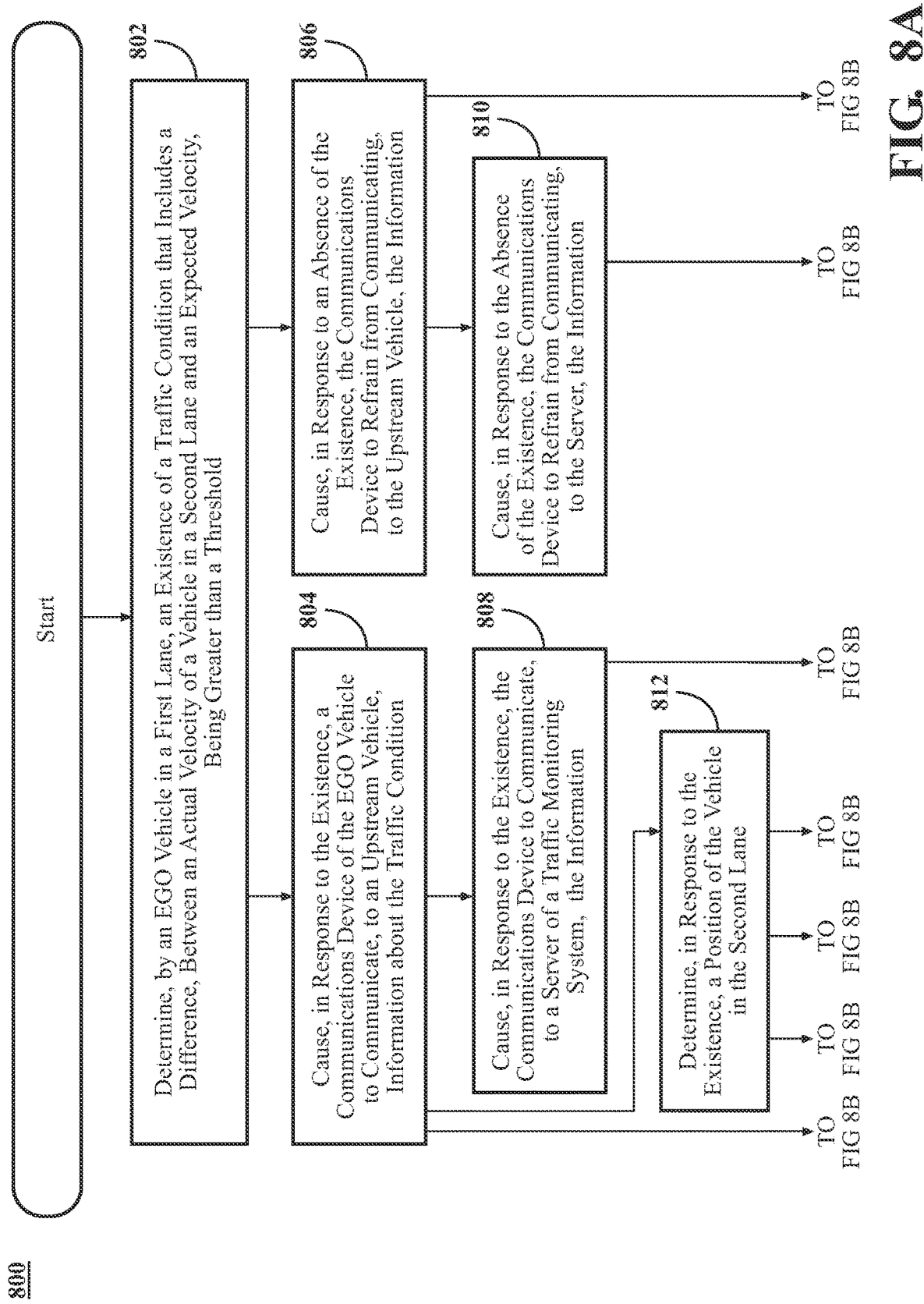

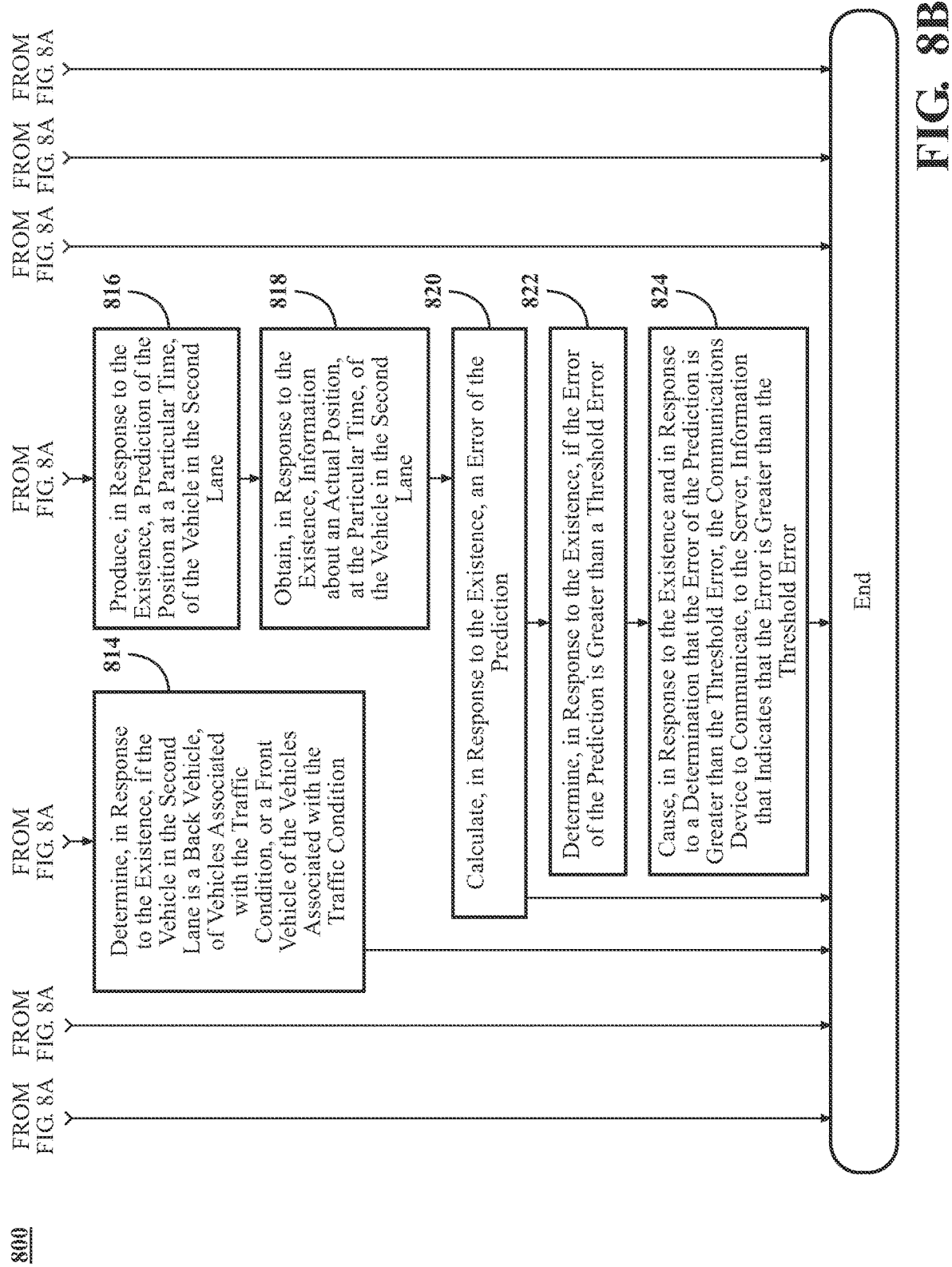

COMMUNICATING A TRAFFIC CONDITION TO AN UPSTREAM VEHICLE

TECHNICAL FIELD

The disclosed technologies are directed to communicating a traffic condition to an upstream vehicle.

BACKGROUND

In order to optimize a flow of traffic, many roads can include more than one lane for a direction of traffic. With more than one lane for a direction of traffic, a vehicle can select to remain moving in a first lane or to change from moving within the first lane to moving within one of one or more other lanes. (Customarily, for a road with more than one lane for a direction of traffic, slower traffic moves in the right lane while faster traffic moves in the one or more other lanes.) Thus, having more than one lane for a direction of traffic can also allow a vehicle to select to change from moving within the first lane to moving within one of one or more other lanes in response to an existence of a traffic condition in the first lane. For example, the traffic condition can include an occurrence of stopped or slow moving vehicles. A traffic monitoring system can also be used to further optimize the flow of traffic. The traffic monitoring system can include a systematic process to collect, analyze, summarize, and retain vehicular traffic data.

SUMMARY

In an embodiment, a system for communicating a traffic condition to an upstream vehicle can include a processor, disposed on an ego vehicle, and a memory. The memory can store a determination module and a communications module. The determination module can include instructions that, when executed by the processor, cause the processor to determine, by the ego vehicle in a first lane, an existence of the traffic condition that includes a difference, between an actual velocity of a vehicle in a second lane and an expected velocity, being greater than a threshold. The communications module can include instructions that, when executed by the processor, cause the processor to: (1) cause, in response to the existence, a communications device of the ego vehicle to communicate, to the upstream vehicle, information about the traffic condition and (2) cause, in response to an absence of the existence, the communications device to refrain from communicating, to the upstream vehicle, the information.

In another embodiment, a method for communicating a traffic condition to an upstream vehicle can include determining, by a processor of an ego vehicle in a first lane, an existence of the traffic condition that includes a difference, between an actual velocity of a vehicle in a second lane and an expected velocity, being greater than a threshold. The method can also include causing, by the processor and in response to the existence, a communications device of the ego vehicle to communicate, to the upstream vehicle, information about the traffic condition. The method can also include causing, by the processor and in response to an absence of the existence, the communications device to refrain from communicating, to the upstream vehicle, the information.

In another embodiment, a non-transitory computer-readable medium for communicating a traffic condition to an upstream vehicle can include instructions that, when executed by one or more processors disposed on an ego vehicle, cause the one or more processors to determine, by the ego vehicle in a first lane, an existence of a traffic condition that includes a difference, between an actual velocity of a vehicle in a second lane and an expected velocity, being greater than a threshold. The non-transitory computer-readable medium can also include instructions that, when executed by the one or more processors, cause the one or more processors to cause, in response to the existence, a communications device of the ego vehicle to communicate, to an upstream vehicle, information about the traffic condition. The non-transitory computer-readable medium can also include instructions that, when executed by the one or more processors, cause the one or more processors to cause, in response to an absence of the existence, the communications device to refrain from communicating, to the upstream vehicle, the information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 8A and 8B are a flow diagram that illustrates an example of a method that is associated with communicating a traffic condition to an upstream vehicle, according to the disclosed technologies.

DETAILED DESCRIPTION

"Connected vehicle" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

The disclosed technologies are directed to communicating a traffic condition to an upstream vehicle. An existence of the traffic condition that includes a difference, between an actual velocity of a vehicle in a first lane and an expected velocity of the vehicle in the first lane, being greater than a threshold can be determined by an ego vehicle in a second lane. For example, the traffic condition can include an occurrence of stopped or slow moving vehicles. For example, the existence of the traffic condition can be determined by: (1) obtaining information about the actual velocity of the vehicle in the first lane and (2) executing a pattern recognition process that, based on the information about the actual velocity, determines the existence of the traffic condition. For example, the pattern recognition process can determine the expected velocity of the vehicle in the first lane. Because the existence of the traffic condition can be determined by the ego vehicle, the disclosed technologies for performing this process can be characterized as comprising a decentralized traffic monitoring system. For example, each of the ego vehicle and the upstream vehicle can be a connected vehicle. A communications device of the ego vehicle can be caused, in response to the existence of the traffic condition, to communicate, to the upstream vehicle, information about the traffic condition. Conversely, the communications device can be caused, in response to an absence of the existence of the traffic condition, to refrain from communicating, to the upstream vehicle, the information about the traffic condition. For example, a component of the upstream vehicle can use, in response to a receipt of the information about the traffic condition, the information about the traffic condition for an action to be performed by the upstream vehicle.

Figure 1:
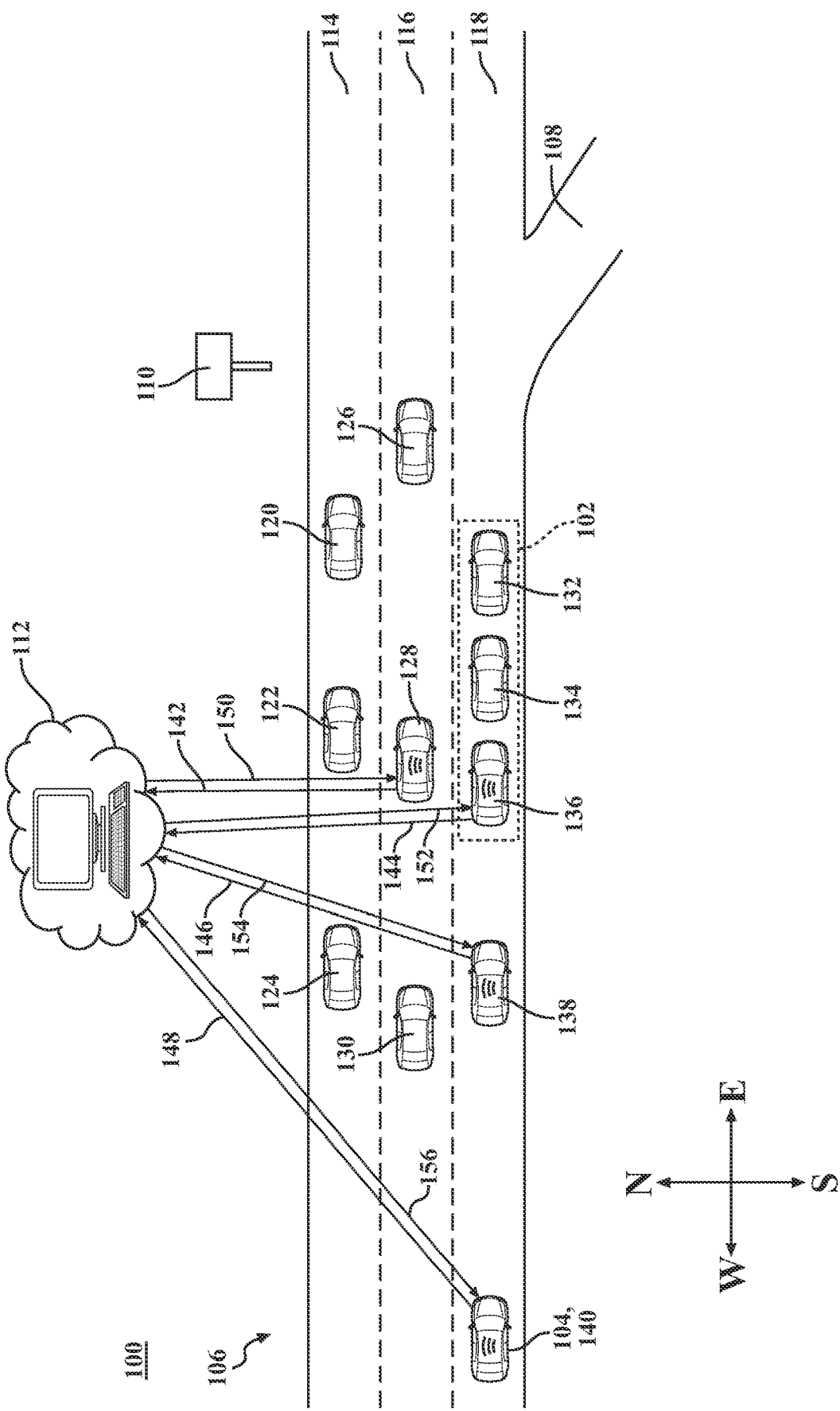
FIG. 1 includes a diagram that illustrates an example of an environment for communicating a traffic condition to an upstream vehicle in a conventional manner.

FIG. 1 includes a diagram that illustrates an example of an environment 100 for communicating a traffic condition 102 to an upstream vehicle 104 in a conventional manner. For example, the environment 100 can include a first road 106 (disposed along a line of latitude), a second road 108, a roadside unit 110, and a server 112 of a traffic monitoring system. For example, the first road 106 can include, for traffic moving in an easterly direction, a first lane 114, a second lane 116, and a third lane 118. For example, the second road 108 can be a ramp of an interchange. For example, the first lane 114 can include a first vehicle 120, a second vehicle 122, and a third vehicle 124. For example, the second lane 116 can include a fourth vehicle 126, a fifth vehicle 128, and a sixth vehicle 130. For example, the third lane 118 can include a seventh vehicle 132, an eighth vehicle 134, a ninth vehicle 136, a tenth vehicle 138, and an eleventh vehicle 140. For example, each of the fifth vehicle 128, the ninth vehicle 136, the tenth vehicle 138, and the eleventh vehicle 140 can be a connected vehicle. The eleventh vehicle 140 can be the upstream vehicle 104. For example, the traffic condition 102, which can include an occurrence of stopped or slow moving vehicles, can include the seventh vehicle 132, the eighth vehicle 134, and the ninth vehicle 136.

In the conventional manner, a determination of an existence of the traffic condition 102 can include having: (1) one or more of the connected vehicles (e.g., the fifth vehicle 128, the ninth vehicle 136, the tenth vehicle 138, and the eleventh vehicle 140) communicate, to the server 112 of the traffic monitoring system, information about traffic in one or more environments of the one or more of the connected vehicles 142, 144, 146, and 148, (2) the server 112 of the traffic monitoring system determine, based on this information, the existence of the traffic condition 102, and (3) the server 112 of the traffic monitoring system communicate, to the one or more connected vehicles, information about the traffic condition 150, 152, 154, and 156. Because the existence of the traffic condition 102 can be determined by the server 112 of the traffic monitoring system, the conventional manner for performing this process can be characterized as comprising a centralized traffic monitoring system. Because an operation of such a centralized traffic monitoring system can include numerous communications from connected vehicles to the server 112 of the traffic monitoring system and from the server 112 of the traffic monitoring system to the connected vehicles, the operation of such a centralized traffic monitoring system can be associated with a high degree of utilization of a channel used for such communications. If such a degree of utilization becomes sufficiently large, a rate of conveyance of such communications can be reduced. Such a reduction in the rate of conveyance can undermine an efficacy of the operation of such a centralized traffic monitoring system.

Figure 2:
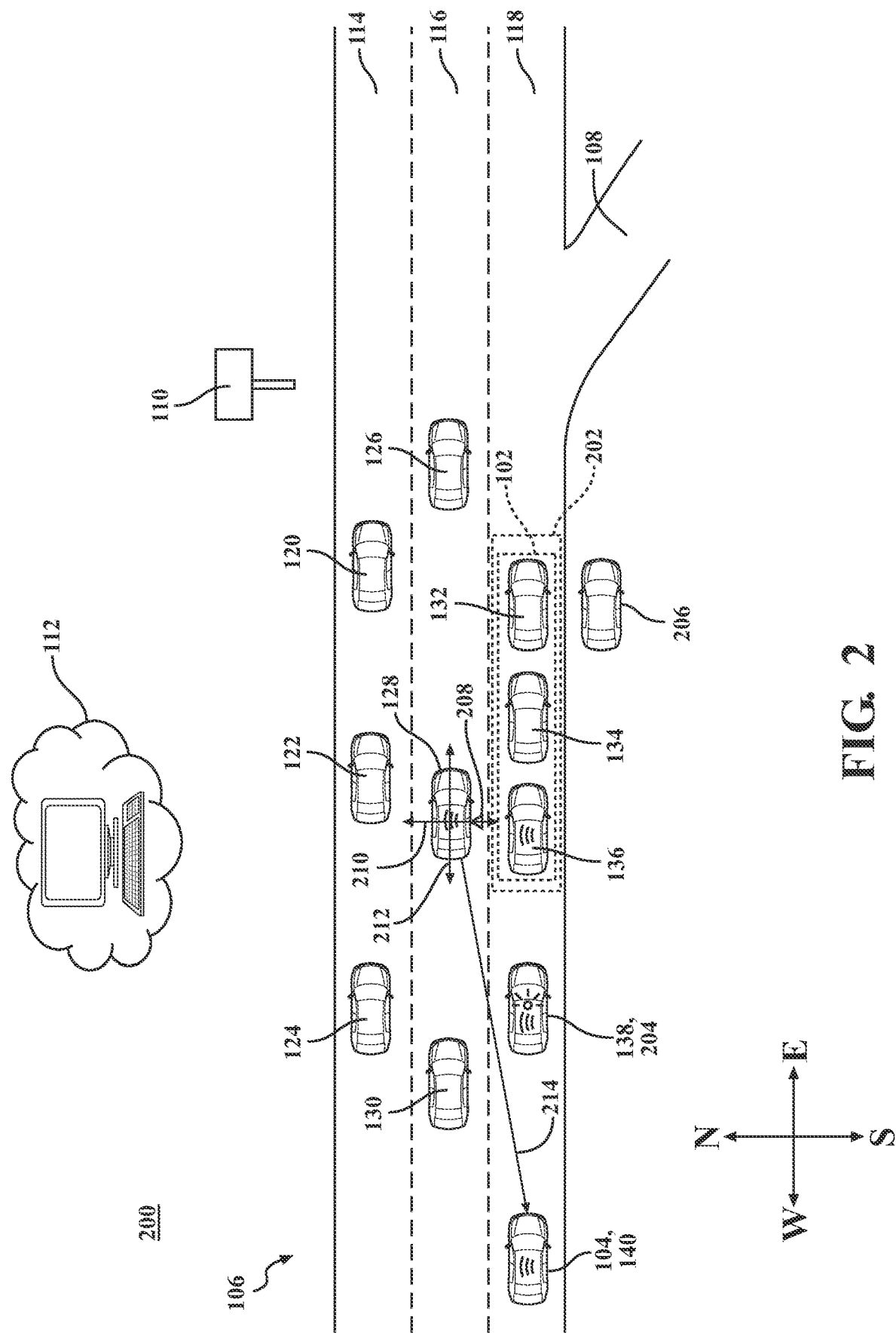
FIG. 2 includes a diagram that illustrates an example of an environment for communicating the traffic condition to the upstream vehicle, according to the disclosed technologies.

FIG. 2 includes a diagram that illustrates an example of an environment 200 for communicating the traffic condition 102 to the upstream vehicle 104, according to the disclosed technologies. For example, the environment 200 can include the first road 106 (disposed along the line of latitude), the second road 108, the roadside unit 110, and the server 112 of the traffic monitoring system. For example, the first road 106 can include, for traffic moving in the easterly direction, the first lane 114, the second lane 116, and the third lane 118. For example, the second road 108 can be the ramp of the interchange. For example, the first lane 114 can include the first vehicle 120, the second vehicle 122, and the third vehicle 124. For example, the second lane 116 can include the fourth vehicle 126, the fifth vehicle 128, and the sixth vehicle 130. For example, the third lane 118 can include the seventh vehicle 132, the eighth vehicle 134, the ninth vehicle 136, the tenth vehicle 138, and the eleventh vehicle 140. For example, each of the fifth vehicle 128, the ninth vehicle 136, the tenth vehicle 138, and the eleventh vehicle 140 can be a connected vehicle. The eleventh vehicle 140 can be the upstream vehicle 104. For example, the traffic condition 102, which can include an occurrence of stopped or slow moving vehicles, can include the seventh vehicle 132, the eighth vehicle 134, and the ninth vehicle 136. For example, an area 202 can be a region associate with an existence of a road condition. For example, the tenth vehicle 138 can be an emergency vehicle 204. For example, the environment 200 can include a twelfth vehicle 206 on a side of the first road 106. For example, a sensor 208 can be disposed on the fifth vehicle 128. For example, the sensor 208 can be configured to detect information from an object at a position that is along a first line 210. The first line 210 can be perpendicular to a second line 212. The second line 212 can be along a direction of movement of the fifth vehicle 128.

Figure 3:
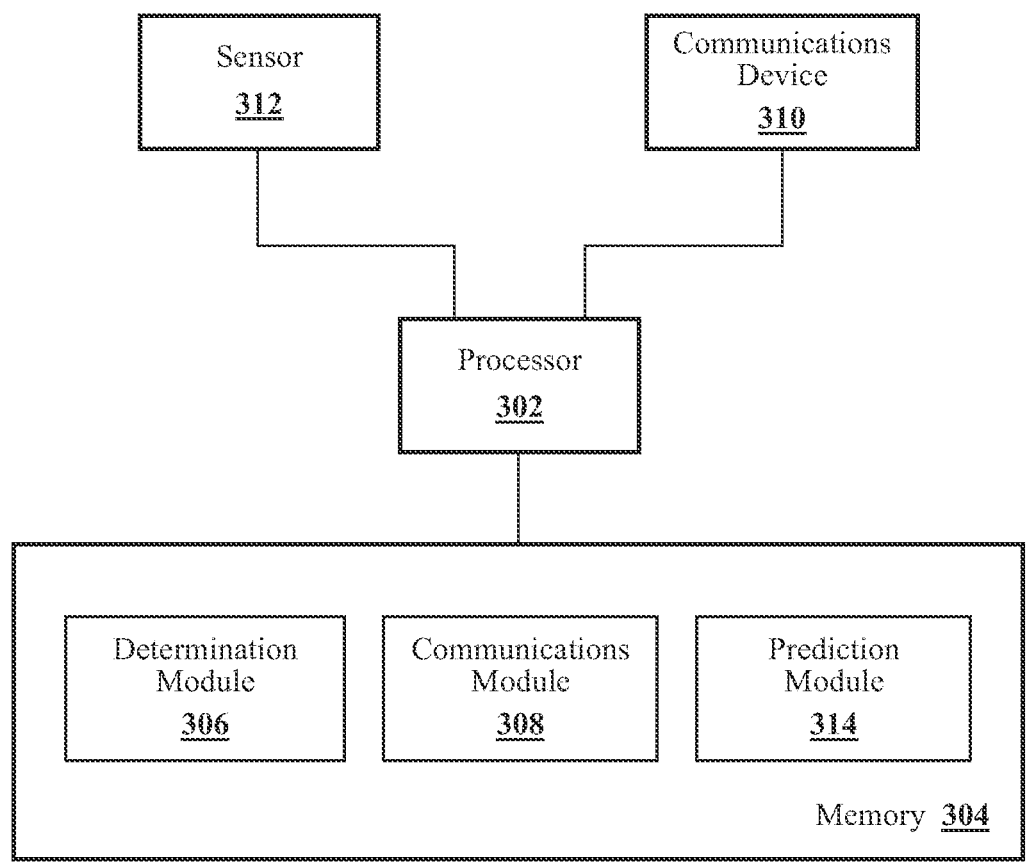
FIG. 3 includes a block diagram that illustrates an example of a system for communicating a traffic condition to an upstream vehicle, according to the disclosed technologies.

FIG. 3 includes a block diagram that illustrates an example of a system 300 for communicating a traffic condition to an upstream vehicle, according to the disclosed technologies. The system 300 can include, for example, a processor 302 and a memory 304. The processor 302 can be disposed on an ego vehicle. The memory 304 can be communicably coupled to the processor 302. The memory 304 can store, for example, a determination module 306 and a communications module 308.

For example, the determination module 306 can include instructions that function to control the processor 302 to determine, by the ego vehicle in a first lane, an existence of a traffic condition that includes a difference, between an actual velocity of a vehicle in a second lane and an expected velocity, being greater than a threshold. For example, the ego vehicle can be the fifth vehicle 128, the first lane can be the second lane 116, the second lane can be the third lane 118, and the vehicle in the second lane can be the ninth vehicle 136 illustrated in FIG. 2.

Returning to FIG. 3, for example, the communications module 308 can include instructions that function to control the processor 302 to cause, in response to the existence of the traffic condition, a communications device 310 of the ego vehicle to communicate, to an upstream vehicle, information about the traffic condition. For example, the communications module 308 can include instructions that function to control the processor 302 to cause, in response to an absence of the existence of the traffic condition, the communications device 310 to refrain from communicating, to the upstream vehicle, the information. For example, the processor 302 can be configured to be communicably coupled to the communications device 310 of the ego vehicle. For example, the upstream vehicle can be the eleventh vehicle 140 illustrated in FIG. 2.

Because the existence of the traffic condition can be determined by the ego vehicle (e.g., the fifth vehicle 128), the disclosed technologies for performing this process can include only one communication 214 from the ego vehicle (e.g., the fifth vehicle 128) to the upstream vehicle 104 (e.g., the eleventh vehicle 140), which, furthermore, may not occur in the absence of the existence of the traffic condition. Thus, an operation of such a decentralized traffic monitoring system can be associated with a low degree of utilization of a channel used for such communications so that a high rate of conveyance of such communications can be maintained.

A component of the upstream vehicle 104 (e.g., the eleventh vehicle 140) can use, in response to a receipt of the information about the traffic condition, the information about the traffic condition for an action to be performed by the upstream vehicle 104 (e.g., the eleventh vehicle 140). For example, the upstream vehicle 104 (e.g., the eleventh vehicle 140) can be an automated vehicle. The component can include one or more vehicle systems of the upstream vehicle 104 (e.g., the eleventh vehicle 140). The one or more vehicle systems can cause an aspect of a movement of the upstream vehicle 104 (e.g., the eleventh vehicle 140) to change based on the information about the traffic condition. Additionally or alternatively, for example, the component can include an output system of the upstream vehicle 104 (e.g., the eleventh vehicle 140). The output system can cause the information about the traffic condition to be presented to an operator of the upstream vehicle 104 (e.g., the eleventh vehicle 140). For example, the output system can be one or more of a display, a speaker, a haptic device, or the like. For example, the display can be one or more of a console display, a head up display, or the like.

For example, the traffic condition can include an occurrence of stopped or slow moving vehicles. For example, the traffic condition can be the traffic condition 102, which can include the seventh vehicle 132, the eighth vehicle 134, and the ninth vehicle 136. For example, a cause of the traffic condition can include one or more of: (1) an increase in a count of vehicles, in a vicinity of the traffic condition, being greater than a threshold count, (2) an existence of a road condition, in the vicinity of the traffic condition, unconducive to having vehicles move at a velocity greater than a threshold velocity, (3) an existence of an emergency vehicle in the vicinity of the traffic condition, (4) an existence of a vehicle on a side of a road in the vicinity of the traffic condition, (5) a situation in which one or more of the vehicle in the second lane or another vehicle in the second lane is one or more of preparing to change from moving within the second lane or changing from moving within the second lane, or (6) or the like. For example, the cause of the traffic condition 102 can include an increase in the count (e.g., three) of vehicles (e.g., the seventh vehicle 132, the eighth vehicle 134, and the ninth vehicle 136), in the vicinity of the traffic condition 102, being greater than a threshold count (e.g., two).

For example, the cause of the traffic condition 102 can include the existence, in the area 202, of a road condition, in the vicinity of the traffic condition 102, unconducive to having vehicles move at a velocity greater than a threshold velocity (e.g., a velocity associated with a free flow of traffic). For example, the road condition can include debris on the first road 106 in the area 202, broken pavement on the first road 106 in the area 202, new pavement of the first road 106 in the area 202, other construction associated with the first road 106 in the area 202, or the like. For example, the cause of the traffic condition 102 can include the existence of the emergency vehicle 204 in the vicinity of the traffic condition 102. For example, the cause of the traffic condition 102 can include the existence of the twelfth vehicle 206 on the side of the first road 106 in the vicinity of the traffic condition 102. For example, the cause of the traffic condition 102 can include a situation in which one or more of the seventh vehicle 132, the eighth vehicle 134, and the ninth vehicle 136 is preparing to change from moving within the third lane 118 (e.g., to the second road 108 (e.g., the ramp of the interchange) or is changing from moving within the third lane 118 (e.g., to the second lane 116).

Returning to FIG. 3, additionally, for example, the communications module 308 can further include instructions that function to control the processor 302 to cause, in response to the existence of the traffic condition, the communications device 310 to communicate, to a server of a traffic monitoring system, the information about the traffic condition. For example, the communications module 308 can include instructions that function to control the processor 302 to cause, in response to the absence of the existence of the traffic condition, the communications device 310 to refrain from communicating, to the server, the information. For example, the server of the traffic monitoring system can be the server 112 of the traffic monitoring system illustrated in FIG. 2.

Returning to FIG. 3, for example, the instructions to determine the existence of the traffic condition can include instructions to: (1) obtain information about the actual velocity of the vehicle in the second lane and (2) execute a pattern recognition process that, based on the information about the actual velocity, determines the existence of the traffic condition.

For example, the instructions to obtain the information about the actual velocity can include instructions to receive, via the communications device 310 and from one or more of the vehicle in the second lane or another source, the information about the actual velocity. For example, the other source can include one or more of another vehicle, a roadside unit, a server of a traffic monitoring system, or the like. For example, the other source can include one or more of the eighth vehicle 134, the tenth vehicle 138, the roadside unit 110, and the server 112 of the traffic monitoring system illustrated in FIG. 2.

Returning to FIG. 3, additionally or alternatively, for example, the instructions to obtain the information about the actual velocity can include instructions to: (1) detect, by a sensor 312 disposed on the ego vehicle, information about one or more states of the vehicle in the second lane and (2) determine, based on the information about the one or more states, the information about the actual velocity. For example, the one or more states can include at least one of one or more positions of the vehicle in the second lane or one or more velocities of the vehicle in the second lane. For example, the processor 302 can be configured to be communicably coupled to the sensor 312 of the ego vehicle.

In a configuration, for example, the system 300 can further include the sensor 312. For example, the sensor 312 can be configured to detect information from an object at a position that is along a first line. The first line can be perpendicular to a second line. The second line can be along a direction of movement of the ego vehicle. For example, the sensor 312 disposed on the ego vehicle can be the sensor 208 disposed on the fifth vehicle 128. For example, the sensor 208 can be configured to detect information from an object at a position that is along the first line 210. The first line 210 can be perpendicular to the second line 212. The second line 212 can be along a direction of movement of the fifth vehicle 128. With reference to FIGS. 2 and 3, for example, the sensor 312 (e.g., the sensor 208) can include one or more of a camera, a lidar device, an ultrasonic ranging device, an infrared ranging device, or the like.

Returning to FIG. 3, for example, the pattern recognition process can include one or more of being based on a traffic flow theory model or being a machine learning process. For example, the instructions to execute the pattern recognition process can include instructions to: (1) determine a measure of a density of vehicles in a vicinity of the ego vehicle and (2) determine, based on the measure of the density and from a graph of vehicle flow versus vehicle density, the expected velocity of the vehicle in the second lane.

For example, the instructions to determine the measure of the density of the vehicles can include instructions to: (1) determine distances between pairs of vehicles in a set of vehicles in a vicinity of the ego vehicle and (2) calculate, based on the distances, the measure of the density of the vehicles. Additionally, for example, the instructions to determine the measure of the density of the vehicles can further include instructions to detect, by a sensor disposed on the ego vehicle, a position of each vehicle in the set of vehicles. For example, each vehicle in a pair of vehicles, of the pairs of vehicles, can be within a same lane as another vehicle in the pair of vehicles. For example, the instructions to calculate the measure of the density of the vehicles can include instructions to: (1) calculate an average of the distances between the pairs of vehicles in the set of vehicles and (2) calculate an inverse of the average.

Figure 4:
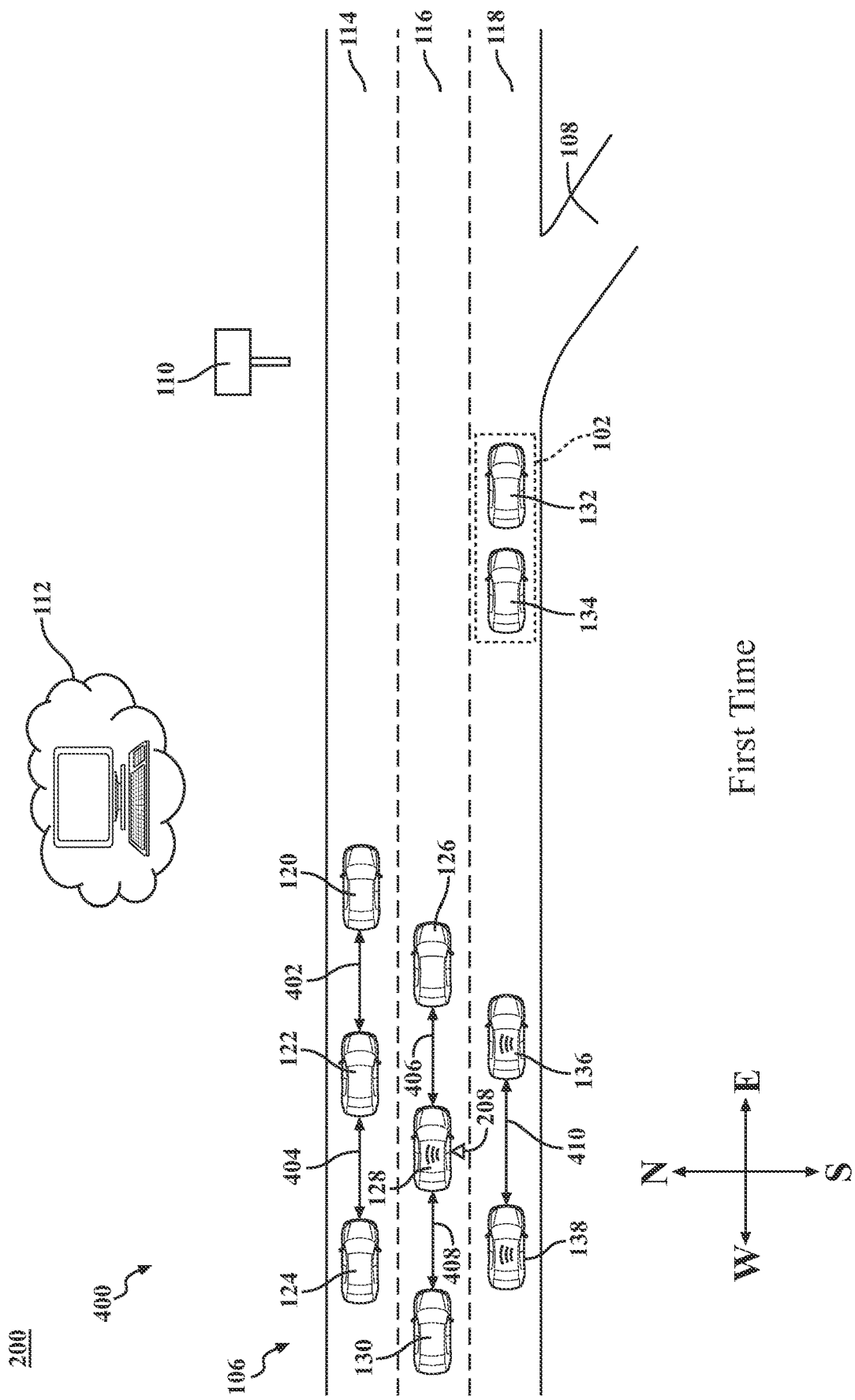
FIG. 4 includes a diagram that illustrates an example of the environment at a first time, according to the disclosed technologies.

FIG. 4 includes a diagram that illustrates an example 400 of the environment 200 at a first time, according to the disclosed technologies. For example, the example 400 of the environment 200 can include the first road 106 (disposed along the line of latitude), the second road 108, the roadside unit 110, and the server 112 of the traffic monitoring system. For example, the first road 106 can include, for traffic moving in the easterly direction, the first lane 114, the second lane 116, and the third lane 118. For example, the second road 108 can be the ramp of the interchange. For example, the first lane 114 can include the first vehicle 120, the second vehicle 122, and the third vehicle 124. For example, the second lane 116 can include the fourth vehicle 126, the fifth vehicle 128, and the sixth vehicle 130. For example, the third lane 118 can include the seventh vehicle 132, the eighth vehicle 134, the ninth vehicle 136, and the tenth vehicle 138. For example, each of the fifth vehicle 128, the ninth vehicle 136, and the tenth vehicle 138 can be a connected vehicle. For example, the traffic condition 102, which can include an occurrence of stopped or slow moving vehicles, can include the seventh vehicle 132 and the eighth vehicle 134. For example, the sensor 208 can be disposed on the fifth vehicle 128.

In the example 400, at the first time, the instructions to determine the measure of the density of the vehicles can include instructions to: (1) detect, by the sensor 208 disposed on the fifth vehicle 128, the position of each vehicle in the set of vehicles in the vicinity of the fifth vehicle 128 (e.g., the first vehicle 120, the second vehicle 122, the third vehicle 124, the fourth vehicle 126, the sixth vehicle 130, the ninth vehicle 136, and the tenth vehicle 138), (2) determine the distances between the pairs of vehicles in the same lane (e.g., a distance 402 between the first vehicle 120 and the second vehicle 122, a distance 404 between the second vehicle 122 and the third vehicle 124, a distance 406 between the fourth vehicle 126 and the fifth vehicle 128, a distance 408 between the fifth vehicle 128 and the sixth vehicle 130, and a distance 410 between the ninth vehicle 136 and the tenth vehicle 138), (3) calculate the average of the distances between the pairs of vehicles in the set of vehicles (e.g., the average of the distance 402, the distance 404, the distance 406, the distance 408, and the distance 410), and (4) calculate the inverse of the average. A result of such instructions can be a local estimate of traffic density.

As illustrate in FIG. 4, each of the distance 402, the distance 404, the distance 406, the distance 408, and the distance 410 is between a back end of a front vehicle and a front end of a back vehicle. One of skill in the art understands, in light of the description herein, that a more accurate determination of the measure of the density of the vehicles can be realized by determining distances between corresponding points of the pairs of vehicles (e.g., between a back end of a front vehicle and a back end of a back vehicle or between a front end of a front vehicle and a front end of a back vehicle). This can be accomplished by: (1) detecting, by the sensor 208 disposed on the fifth vehicle 128, the position of a corresponding point of each vehicle in the set of vehicles in the vicinity of the fifth vehicle 128, (2) adding, to each of the distance 402, the distance 404, the distance 406, the distance 408, and the distance 410, an average vehicle length, or (3) the like.

Figure 5:
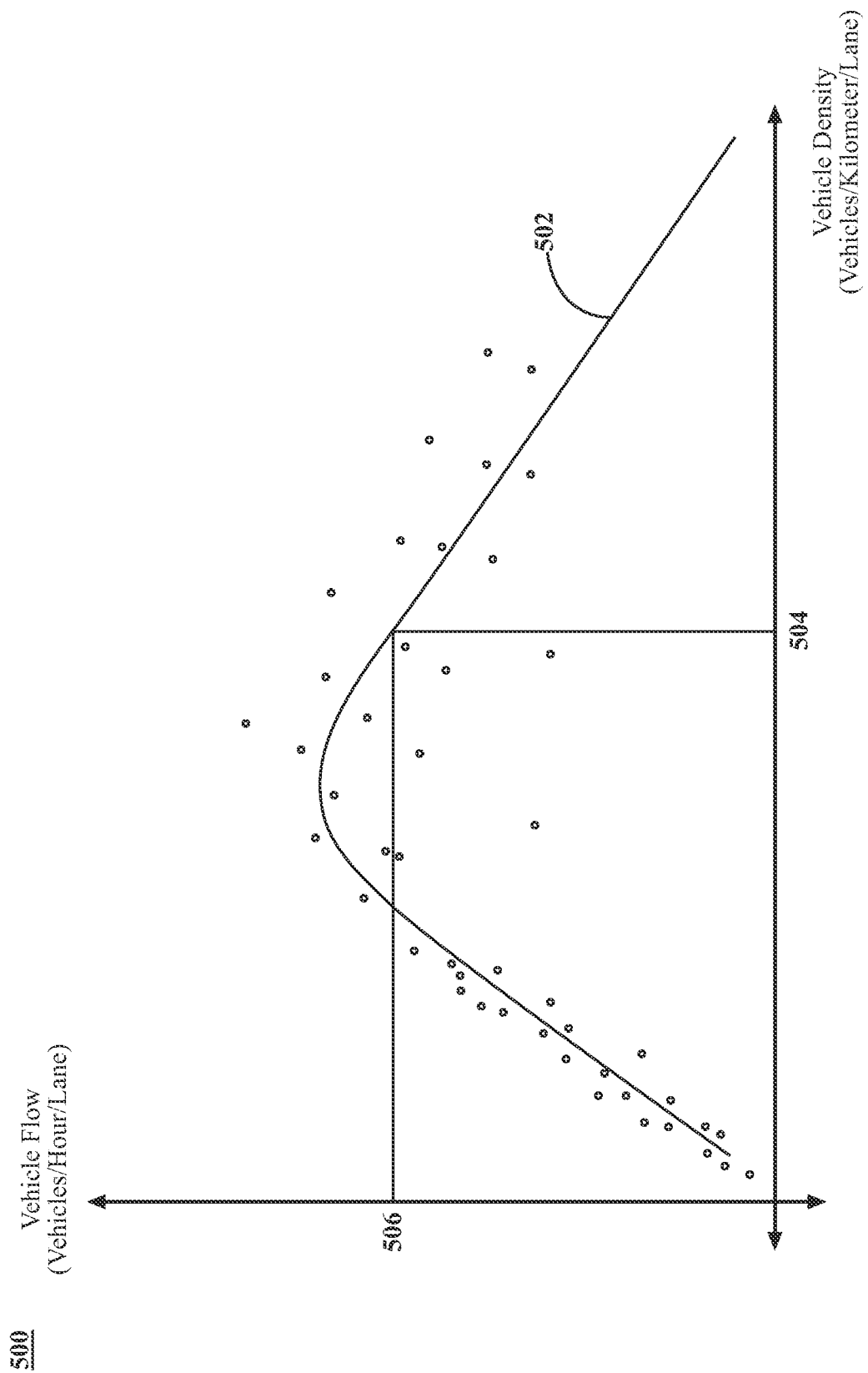
FIG. 5 includes an example of a graph of vehicle flow versus vehicle density.

FIG. 5 includes an example of a graph 500 of vehicle flow versus vehicle density. For example, vehicle flow can be a count of a number of vehicles that move pass a point in a lane in a specific duration of time (e.g., an hour): vehicles per hour per lane. For example, vehicle density can be a count of a number of vehicles within a specific length (e.g., a kilometer) of the lane: vehicles per kilometer per lane. For example, the graph 500 can have been prepared from empirical data. For example, a curve 502 can be a best-fit curve for the empirical data. For example, an expected velocity of a vehicle can be a quotient of a specific vehicle flow, for a specific vehicle density, divided by the specific vehicle density. With reference to FIGS. 4 and 5, for example, having determined the measure of the density 504 of the vehicles in the vicinity of the fifth vehicle 128, a corresponding vehicle flow 506 can be determined from the graph 500 and the expected velocity of the ninth vehicle 136 can be determined as the quotient of the corresponding vehicle flow 506 divided by the measure of the density 504.

Returning to FIG. 3, in a configuration, for example, the determination module 306 can further includes instructions that function to control the processor 302 to determine, in response to the existence of the traffic condition, a position of the vehicle in the second lane associated with the traffic condition.

In a variation of this configuration, for example, the determination module 306 can further include instructions that function to control the processor 302 to determine, in response to the existence of the traffic condition, if the vehicle in the second lane is a back vehicle, of vehicles associated with the traffic condition, or a front vehicle of the vehicles associated with the traffic condition.

For example, the instructions to determine if the vehicle in the second lane is the back vehicle or the front vehicle can include instructions to: (1) determine a change, with respect to time, of the expected velocity of the vehicle in the second lane, (2) determine that the vehicle in the second lane is the back vehicle in response to a determination that the change is a decrease of the expected velocity, and (3) determine that the vehicle in the second lane is the front vehicle in response to a determination that the change is an increase of the expected velocity.

Figure 6:
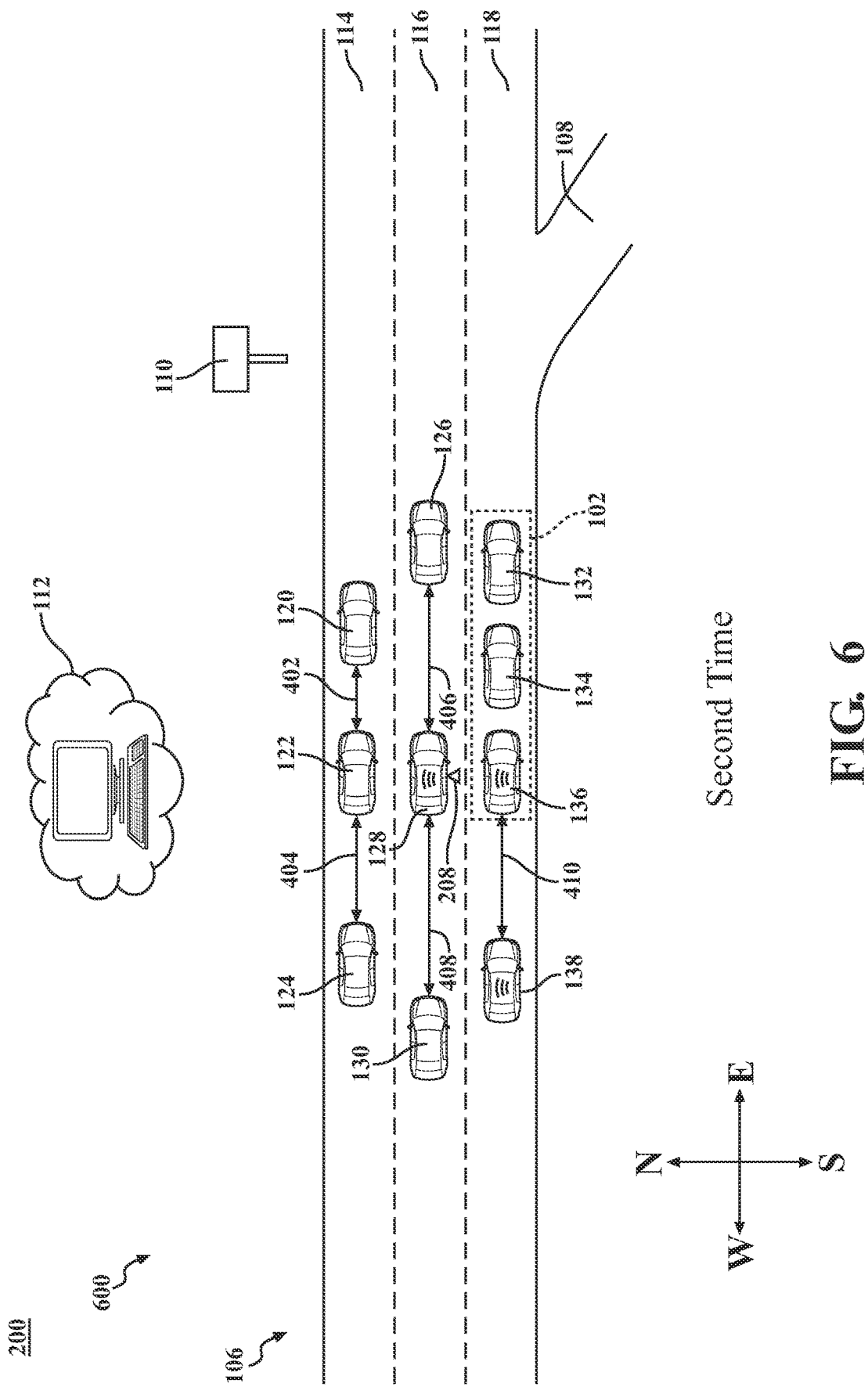
FIG. 6 includes a diagram that illustrates an example of the environment at a second time, according to the disclosed technologies.

FIG. 6 includes a diagram that illustrates an example 600 of the environment 200 at a second time, according to the disclosed technologies. For example, the example 600 of the environment 200 can include the first road 106 (disposed along the line of latitude), the second road 108, the roadside unit 110, and the server 112 of the traffic monitoring system. For example, the first road 106 can include, for traffic moving in the easterly direction, the first lane 114, the second lane 116, and the third lane 118. For example, the second road 108 can be the ramp of the interchange. For example, the first lane 114 can include the first vehicle 120, the second vehicle 122, and the third vehicle 124. For example, the second lane 116 can include the fourth vehicle 126, the fifth vehicle 128, and the sixth vehicle 130. For example, the third lane 118 can include the seventh vehicle 132, the eighth vehicle 134, the ninth vehicle 136, and the tenth vehicle 138. For example, each of the fifth vehicle 128, the ninth vehicle 136, and the tenth vehicle 138 can be a connected vehicle. For example, the traffic condition 102, which can include an occurrence of stopped or slow moving vehicles, can include the seventh vehicle 132, the eighth vehicle 134, and the ninth vehicle 136. For example, the sensor 208 can be disposed on the fifth vehicle 128.

In the example 600, at the second time, the instructions to determine the measure of the density of the vehicles can include instructions to: (1) detect, by the sensor 208 disposed on the fifth vehicle 128, the position of each vehicle in the set of vehicles in the vicinity of the fifth vehicle 128 (e.g., the first vehicle 120, the second vehicle 122, the third vehicle 124, the fourth vehicle 126, the sixth vehicle 130, the ninth vehicle 136, and the tenth vehicle 138), (2) determine the distances between the pairs of vehicles in the same lane (e.g., the distance 402 between the first vehicle 120 and the second vehicle 122, the distance 404 between the second vehicle 122 and the third vehicle 124, the distance 406 between the fourth vehicle 126 and the fifth vehicle 128, the distance 408 between the fifth vehicle 128 and the sixth vehicle 140, and the distance 410 between the ninth vehicle 136 and the tenth vehicle 138), (3) calculate the average of the distances between the pairs of vehicles in the set of vehicles (e.g., the average of the distance 402, the distance 404, the distance 406, the distance 408, and the distance 410), and (4) calculate the inverse of the average. A result of such instructions can be a local estimate of traffic density.

In the example 600, at the second time, the instructions to determine the change, with respect to time, of the expected velocity of the ninth vehicle 136 can determine, based on the change, with respect to time, of the distance 410 being a reduction of the distance 410 (so that: (1) the average of the distance 402, the distance 404, the distance 406, the distance 408, and the distance 410 is reduced and (2) the inverse of the average is increased), that the expected velocity of the ninth vehicle 136 is a decrease of the expected velocity. The instructions to determine that the ninth vehicle 136 is the back vehicle of the vehicles associated with the traffic condition 102 can determine that the ninth vehicle 136 is the back vehicle in response to a determination that the change of the expected velocity of the ninth vehicle 136 is a decrease of the expected velocity.

Alternatively or additionally, the instructions to determine that the ninth vehicle 136 is the back vehicle of the vehicles associated with the traffic condition 102 can determine that the ninth vehicle 136 is the back vehicle in response to a determination that: (1) an actual velocity of the ninth vehicle 136 is less than the expected velocity of the ninth vehicle 136 and (2) a difference between the actual velocity of the ninth vehicle 136 and the expected velocity of the ninth vehicle 136 is greater than a change threshold.

Figure 7:
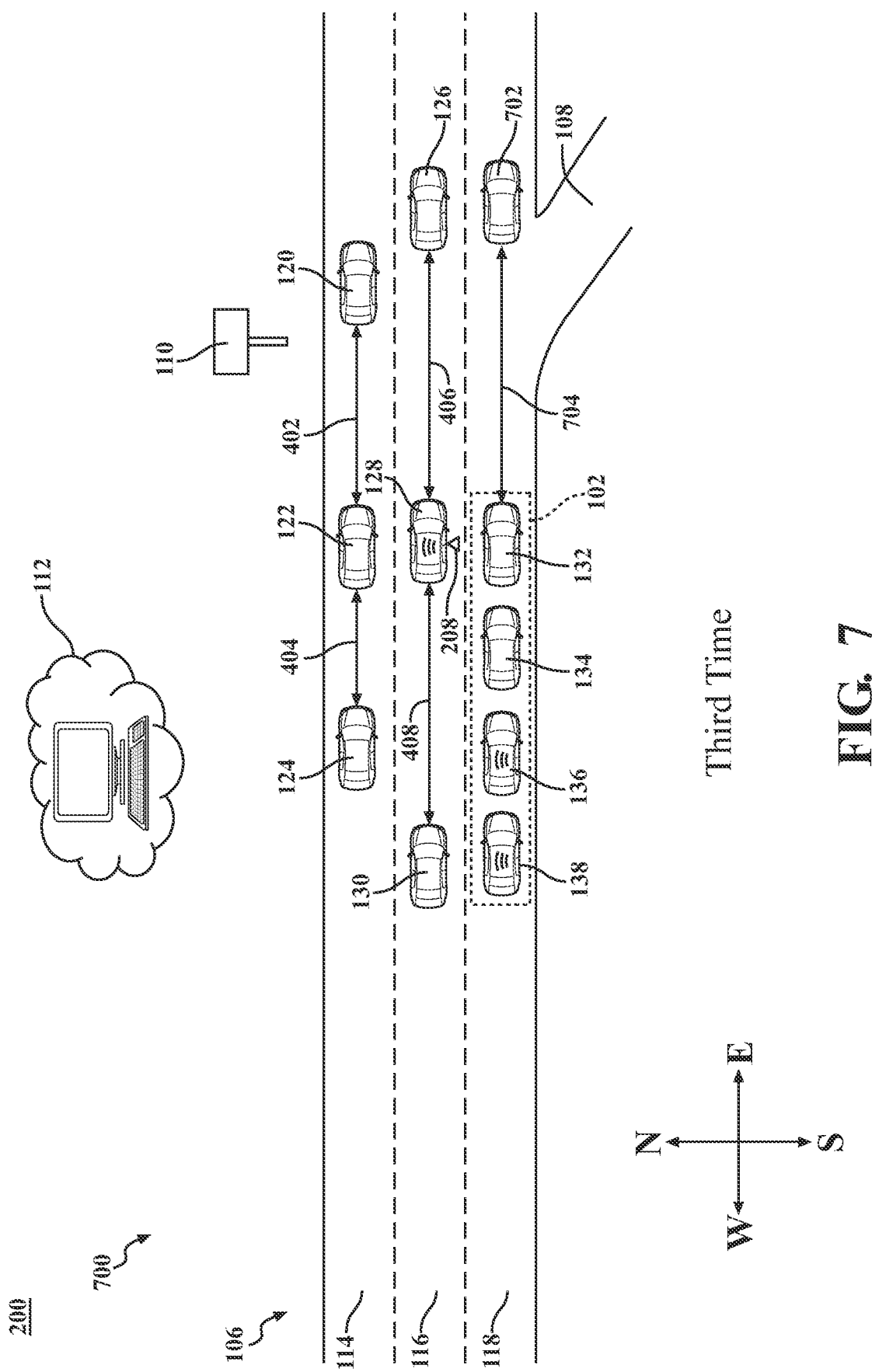
FIG. 7 includes a diagram that illustrates an example of the environment at a third time, according to the disclosed technologies.

FIG. 7 includes a diagram that illustrates an example 700 of the environment 200 at a third time, according to the disclosed technologies. For example, the example 700 of the environment 200 can include the first road 106 (disposed along the line of latitude), the second road 108, the roadside unit 110, and the server 112 of the traffic monitoring system. For example, the first road 106 can include, for traffic moving in the easterly direction, the first lane 114, the second lane 116, and the third lane 118. For example, the second road 108 can be the ramp of the interchange. For example, the first lane 114 can include the first vehicle 120, the second vehicle 122, and the third vehicle 124. For example, the second lane 116 can include the fourth vehicle 126, the fifth vehicle 128, and the sixth vehicle 130. For example, the third lane 118 can include the seventh vehicle 132, the eighth vehicle 134, the ninth vehicle 136, the tenth vehicle 138, and an eleventh vehicle 702. For example, each of the fifth vehicle 128, the ninth vehicle 136, and the tenth vehicle 138 can be a connected vehicle. For example, the traffic condition 102, which can include an occurrence of stopped or slow moving vehicles, can include the seventh vehicle 132, the eighth vehicle 134, the ninth vehicle 136, and the tenth vehicle 138. For example, the sensor 208 can be disposed on the fifth vehicle 128.

In the example 700, at the third time, the instructions to determine the measure of the density of the vehicles can include instructions to: (1) detect, by the sensor 208 disposed on the fifth vehicle 128, the position of each vehicle in the set of vehicles in the vicinity of the fifth vehicle 128 (e.g., the first vehicle 120, the second vehicle 122, the third vehicle 124, the fourth vehicle 126, the sixth vehicle 130, the seventh vehicle 132, and the eleventh vehicle 702), (2) determine the distances between the pairs of vehicles in the same lane (e.g., the distance 402 between the first vehicle 120 and the second vehicle 122, the distance 404 between the second vehicle 122 and the third vehicle 124, the distance 406 between the fourth vehicle 126 and the fifth vehicle 128, the distance 408 between the fifth vehicle 128 and the sixth vehicle 140, and a distance 704 between the seventh vehicle 132 and the eleventh vehicle 702), (3) calculate the average of the distances between the pairs of vehicles in the set of vehicles (e.g., the average of the distance 402, the distance 404, the distance 406, the distance

408, and the distance 704), and (4) calculate the inverse of the average. A result of such instructions can be a local estimate of traffic density.

In the example 700, at the third time, the instructions to determine the change, with respect to time, of the expected velocity of the seventh vehicle 132 can determine, based on the change, with respect to time, of the distance 704 being an increase of the distance 704 (so that: (1) the average of the distance 402, the distance 404, the distance 406, the distance 408, and the distance 704 is increased and (2) the inverse of the average is reduced), that the expected velocity of the seventh vehicle 132 is an increase of the expected velocity. The instructions to determine that the seventh vehicle 132 is the front vehicle of the vehicles associated with the traffic condition 102 can determine that the seventh vehicle 132 is the front vehicle in response to a determination that the change of the expected velocity of the seventh vehicle 132 is an increase of the expected velocity.

Alternatively or additionally, the instructions to determine that the seventh vehicle 132 is the front vehicle of the vehicles associated with the traffic condition 102 can determine that the seventh vehicle 132 is the front vehicle in response to a determination that: (1) an actual velocity of the seventh vehicle 132 is greater than the expected velocity of the seventh vehicle 132 and (2) a difference between the actual velocity of the seventh vehicle 132 and the expected velocity of the seventh vehicle 132 is greater than a change threshold.

In another variation of this configuration, for example, the memory 304 can further store a prediction module 314. For example, the prediction module 314 can include instructions that function to control the processor 302 to: (1) produce, in response to the existence of the traffic condition, a prediction of the position, at a particular time, of the vehicle in the second lane, (2) obtain, in response to the existence of the traffic condition, information about an actual position, at the particular time, of the vehicle in the second lane, and (3) calculate, in response to the existence of the traffic condition, an error of the prediction. The error of the prediction can be a difference between the actual position and the prediction of the position.

Additionally, for example, the prediction module 314 can further include instructions that function to control the processor 302 to determine, in response to the existence of the traffic condition, if the error of the prediction is greater than a threshold error. For example, the communications module 308 can further include instructions that function to control the processor 302 to cause, in response to the existence of the traffic condition and in response to a determination that the error of the prediction is greater than the threshold error, the communications device 310 to communicate, to a server of a traffic monitoring system, information that indicates that the error of the prediction is greater than the threshold error. For example, the server of the traffic monitoring system can be the server 112 of the traffic monitoring system illustrated in FIG. 2.

The server of the traffic monitoring system can initiate, in response to a receipt of the information that indicates that the error of the prediction is greater than the threshold error, a supplemental process to monitor the position of the vehicle in the second lane associated with the traffic condition.

FIGS. 8A and 8B are a flow diagram that illustrates an example of a method 800 that is associated with communicating a traffic condition to an upstream vehicle, according to the disclosed technologies. Although the method 800 is described in combination with the system 300 illustrated in FIG. 3, one of skill in the art understands, in light of the description herein, that the method 800 is not limited to being implemented by the system 300 illustrated in FIG. 3. Rather, the system 300 illustrated in FIG. 3 is an example of a system that may be used to implement the method 800. Additionally, although the method 800 is illustrated as a generally serial process, various aspects of the method 800 may be able to be executed in parallel.

In FIG. 8A, in the method 800, at an operation 802, for example, the determination module 306 can determine, by an ego vehicle in a first lane, an existence of a traffic condition that includes a difference, between an actual velocity of a vehicle in a second lane and an expected velocity, being greater than a threshold.

At an operation 804, for example, the communications module 308 can cause, in response to the existence of the traffic condition, the communications device 310 of the ego vehicle to communicate, to an upstream vehicle, information about the traffic condition.

At an operation 806, for example, the communications module 308 can cause, in response to an absence of the existence of the traffic condition, the communications device 310 to refrain from communicating, to the upstream vehicle, the information.

Additionally, at an operation 808, for example, the communications module 308 can cause, in response to the existence of the traffic condition, the communications device 310 to communicate, to a server of a traffic monitoring system, the information about the traffic condition.

Additionally, at an operation 810, for example, the communications module 308 can cause, in response to the absence of the existence of the traffic condition, the communications device 310 to refrain from communicating, to the server, the information.

In a configuration, at an operation 812, for example, the determination module 306 can determine, in response to the existence of the traffic condition, a position of the vehicle in the second lane associated with the traffic condition.

In FIG. 8B, in the method 800, in a variation of this configuration, at an operation 814, for example, the determination module 306 can determine, in response to the existence of the traffic condition, if the vehicle in the second lane is a back vehicle, of vehicles associated with the traffic condition, or a front vehicle of the vehicles associated with the traffic condition.

In another variation of this configuration, at an operation 816, for example, the prediction module 314 can produce, in response to the existence of the traffic condition, a prediction of the position, at a particular time, of the vehicle in the second lane.

In this other variation of this configuration, at an operation 818, for example, the prediction module 314 can obtain, in response to the existence of the traffic condition, information about an actual position, at the particular time, of the vehicle in the second lane.

In this other variation of this configuration, at an operation 820, for example, the prediction module 314 can calculate, in response to the existence of the traffic condition, an error of the prediction. The error of the prediction can be a difference between the actual position and the prediction of the position.

In this other variation of this configuration, additionally, at an operation 822, for example, the prediction module 314 can determine, in response to the existence of the traffic condition, if the error of the prediction is greater than a threshold error.

In this other variation of this configuration, additionally, at an operation 824, for example, the communications module 308 can cause, in response to the existence of the traffic condition and in response to a determination that the error of the prediction is greater than the threshold error, the communications device 310 to communicate, to a server of a traffic monitoring system, information that indicates that the error of the prediction is greater than the threshold error.

Figure 9:
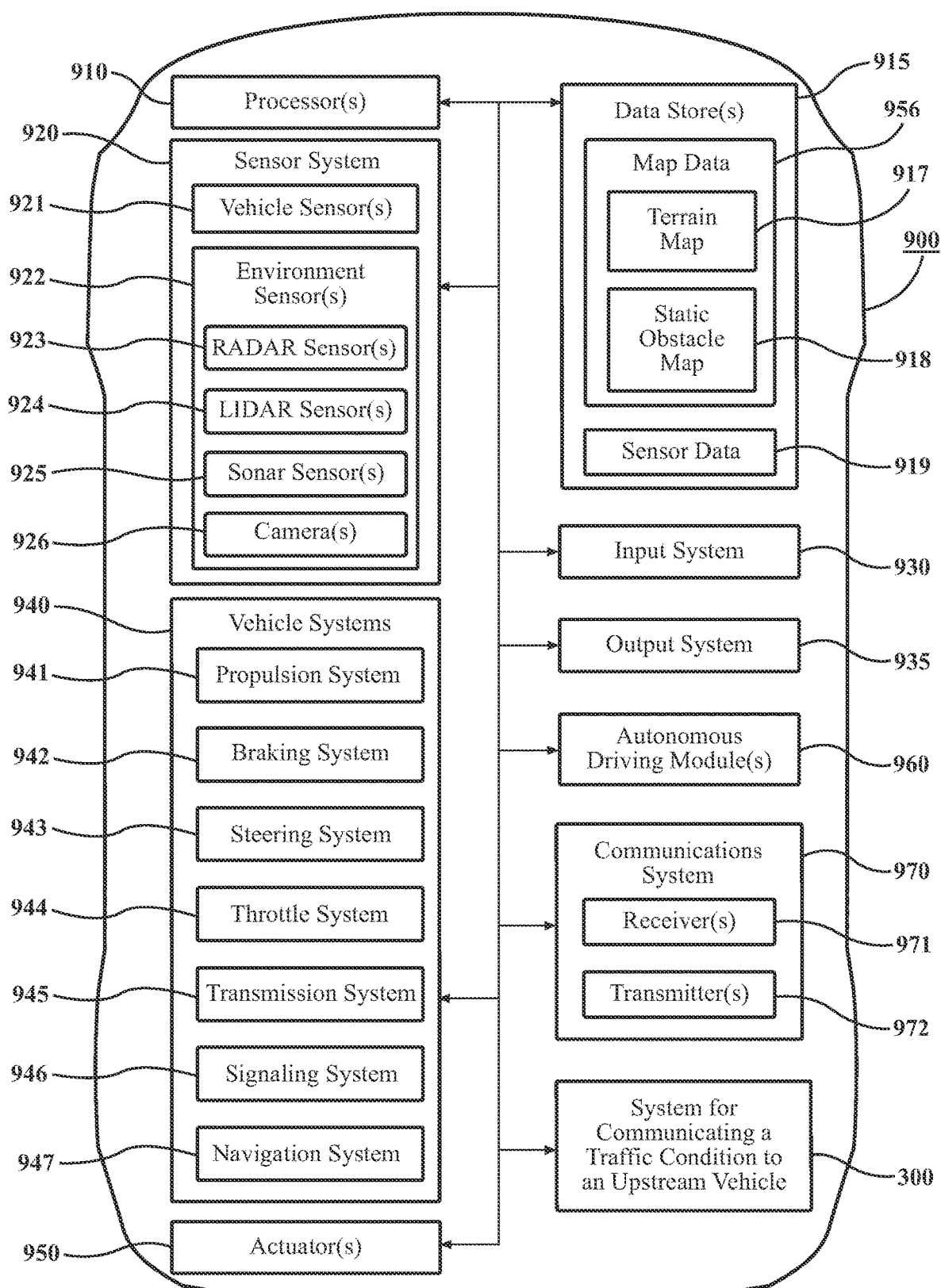
FIG. 9 includes a block diagram that illustrates an example of elements disposed on a vehicle, according to the disclosed technologies.

FIG. 9 includes a block diagram that illustrates an example of elements disposed on a vehicle 900, according to the disclosed technologies. As used herein, a "vehicle" can be any form of powered transport. In one or more implementations, the vehicle 900 can be an automobile. While arrangements described herein are with respect to automobiles, one of skill in the art understands, in light of the description herein, that embodiments are not limited to automobiles.

In some embodiments, the vehicle 900 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 900 is performed according to inputs received from a user (e.g., human driver). In one or more arrangements, the vehicle 900 can be a conventional vehicle that is configured to operate in only a manual mode.

In one or more embodiments, the vehicle 900 can be an automated vehicle. As used herein, "automated vehicle" can refer to a vehicle that operates in an automated mode. As used herein, "automated mode" can refer to navigating and/or maneuvering the vehicle 900 along a travel route using one or more computing systems to control the vehicle 900 with minimal or no input from a human driver. In one or more embodiments, the vehicle 900 can be highly automated or completely automated. In one embodiment, the vehicle 900 can be configured with one or more semi-automated operational modes in which one or more computing systems perform a portion of the navigation and/or maneuvering of the vehicle along a travel route, and a vehicle operator (i.e., driver) provides inputs to the vehicle 900 to perform a portion of the navigation and/or maneuvering of the vehicle 900 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 900 can include various elements. The vehicle 900 can have any combination of the various elements illustrated in FIG. 9. In various embodiments, it may not be necessary for the vehicle 900 to include all of the elements illustrated in FIG. 9. Furthermore, the vehicle 900 can have elements in addition to those illustrated in FIG. 9. While the various elements are illustrated in FIG. 9 as being located within the vehicle 900, one or more of these elements can be located external to the vehicle 900. Furthermore, the elements illustrated may be physically separated by large distances. For example, as described, one or more components of the disclosed system can be implemented within the vehicle 900 while other components of the system can be implemented within a cloud-computing environment, as described below. For example, the elements can include one or more processors 910, one or more data stores 915, a sensor system 920, an input system 930, an output system 935, vehicle systems 940, one or more actuators 950, one or more automated driving modules 960, a communications system 970, and the system 300 for communicating a traffic condition to an upstream vehicle.

In one or more arrangements, the one or more processors 910 can be a main processor of the vehicle 900. For example, the one or more processors 910 can be an electronic control unit (ECU). For example, functions and/or operations of the processor 302 (illustrated in FIG. 3) can be realized by the one or more processors 910.

The one or more data stores 915 can store, for example, one or more types of data. For example, functions and/or operations of the memory 304 (illustrated in FIG. 3) can be realized by the one or more data stores 915. The one or more data stores 915 can include volatile memory and/or non-volatile memory. Examples of suitable memory for the one or more data stores 915 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 915 can be a component of the one or more processors 910. Additionally or alternatively, the one or more data stores 915 can be operatively connected to the one or more processors 910 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 915 can store map data 916. The map data 916 can include maps of one or more geographic areas. In some instances, the map data 916 can include information or data on roads, traffic control devices, road markings, structures, features, and/or landmarks in the one or more geographic areas. The map data 916 can be in any suitable form. In some instances, the map data 916 can include aerial views of an area. In some instances, the map data 916 can include ground views of an area, including 360-degree ground views. The map data 916 can include measurements, dimensions, distances, and/or information for one or more items included in the map data 916 and/or relative to other items included in the map data 916. The map data 916 can include a digital map with information about road geometry. The map data 916 can be high quality and/or highly detailed.

In one or more arrangements, the map data 916 can include one or more terrain maps 917. The one or more terrain maps 917 can include information about the ground, terrain, roads, surfaces, and/or other features of one or more geographic areas. The one or more terrain maps 917 can include elevation data of the one or more geographic areas. The map data 916 can be high quality and/or highly detailed. The one or more terrain maps 917 can define one or more ground surfaces, which can include paved roads, unpaved roads, land, and other things that define a ground surface.

In one or more arrangements, the map data 916 can include one or more static obstacle maps 918. The one or more static obstacle maps 918 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 918 can have location data, size data, dimension data, material data, and/or other data associated with them. The one or more static obstacle maps 918 can include measurements, dimensions, distances, and/or information for one or more static obstacles. The one or more static obstacle maps 918 can be high quality and/or highly detailed. The one or more static obstacle maps 918 can be updated to reflect changes within a mapped area.

In one or more arrangements, the one or more data stores 915 can store sensor data 919. As used herein, "sensor data" can refer to any information about the sensors with which the vehicle 900 can be equipped including the capabilities of and other information about such sensors. The sensor data 919 can relate to one or more sensors of the sensor system 920. For example, in one or more arrangements, the sensor data 919 can include information about one or more lidar sensors 924 of the sensor system 920.

In some arrangements, at least a portion of the map data 916 and/or the sensor data 919 can be located in one or more data stores 915 that are located onboard the vehicle 900. Alternatively or additionally, at least a portion of the map data 916 and/or the sensor data 919 can be located in one or more data stores 915 that are located remotely from the vehicle 900.

The sensor system 920 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 920 includes a plurality of sensors, the sensors can work independently from each other. Alternatively, two or more of the sensors can work in combination with each other. In such a case, the two or more sensors can form a sensor network. The sensor system 920 and/or the one or more sensors can be operatively connected to the one or more processors 910, the one or more data stores 915, and/or another element of the vehicle 900 (including any of the elements illustrated in FIG. 9). The sensor system 920 can acquire data of at least a portion of the external environment of the vehicle 900 (e.g., nearby vehicles). The sensor system 920 can include any suitable type of sensor. Various examples of different types of sensors are described herein. However, one of skill in the art understands that the embodiments are not limited to the particular sensors described herein.

The sensor system 920 can include one or more vehicle sensors 921. The one or more vehicle sensors 921 can detect, determine, and/or sense information about the vehicle 900 itself. In one or more arrangements, the one or more vehicle sensors 921 can be configured to detect and/or sense position and orientation changes of the vehicle 900 such as, for example, based on inertial acceleration. In one or more arrangements, the one or more vehicle sensors 921 can include one or more accelerometers, one or more gyroscopes, an inertial measurement unit (IMU), a dead-reckoning system, a global navigation satellite system (GNSS), a global positioning system (GPS), a navigation system 947, and /or other suitable sensors. The one or more vehicle sensors 921 can be configured to detect and/or sense one or more characteristics of the vehicle 900. In one or more arrangements, the one or more vehicle sensors 921 can include a speedometer to determine a current speed of the vehicle 900.

Alternatively or additionally, the sensor system 920 can include one or more environment sensors 922 configured to acquire and/or sense driving environment data. For example, functions and/or operations of one or more of the sensor 208 (illustrated in FIG. 2) or the sensor 312 (illustrated in FIG. 3) can be realized by the one or more environment sensors 922. As used herein, "driving environment data" can include data or information about the external environment in which a vehicle is located or one or more portions thereof. For example, the one or more environment sensors 922 can be configured to detect, quantify, and/or sense obstacles in at least a portion of the external environment of the vehicle 900 and/or information/data about such obstacles. Such obstacles may be stationary objects and/or dynamic objects. The one or more environment sensors 922 can be configured to detect, measure, quantify, and/or sense other things in the external environment of the vehicle 900 such as, for example, lane markers, signs, traffic lights, traffic signs, lane lines, crosswalks, curbs proximate the vehicle 900, off-road objects, etc.

Various examples of sensors of the sensor system 920 are described herein. The example sensors may be part of the one or more vehicle sensors 921 and/or the one or more environment sensors 922. However, one of skill in the art understands that the embodiments are not limited to the particular sensors described.

In one or more arrangements, the one or more environment sensors 922 can include one or more radar sensors 923, one or more lidar sensors 924, one or more sonar sensors 925, and/or one or more cameras 926. In one or more arrangements, the one or more cameras 926 can be one or more high dynamic range (HDR) cameras or one or more infrared (IR) cameras. For example, the one or more cameras 926 can be used to record a reality of a state of an item of information that can appear in the digital map.

The input system 930 can include any device, component, system, element, arrangement, or groups thereof that enable information/data to be entered into a machine. The input system 930 can receive an input from a vehicle passenger (e.g., a driver or a passenger). The output system 935 can include any device, component, system, element, arrangement, or groups thereof that enable information/data to be presented to a vehicle passenger (e.g., a driver or a passenger).

Various examples of the one or more vehicle systems 940 are illustrated in FIG. 9. However, one of skill in the art understands that the vehicle 900 can include more, fewer, or different vehicle systems. Although particular vehicle systems can be separately defined, each or any of the systems or portions thereof may be otherwise combined or segregated via hardware and/or software within the vehicle 900. For example, the one or more vehicle systems 940 can include a propulsion system 941, a braking system 942, a steering system 943, a throttle system 944, a transmission system 945, a signaling system 946, and/or the navigation system 947. Each of these systems can include one or more devices, components, and/or a combination thereof, now known or later developed.

The navigation system 947 can include one or more devices, applications, and/or combinations thereof, now known or later developed, configured to determine the geographic location of the vehicle 900 and/or to determine a travel route for the vehicle 900. The navigation system 947 can include one or more mapping applications to determine a travel route for the vehicle 900. The navigation system 947 can include a global positioning system, a local positioning system, a geolocation system, and/or a combination thereof.

The one or more actuators 950 can be any element or combination of elements operable to modify, adjust, and/or alter one or more of the vehicle systems 940 or components thereof responsive to receiving signals or other inputs from the one or more processors 910 and/or the one or more automated driving modules 960. Any suitable actuator can be used. For example, the one or more actuators 950 can include motors, pneumatic actuators, hydraulic pistons, relays, solenoids, and/or piezoelectric actuators.

The one or more processors 910 and/or the one or more automated driving modules 960 can be operatively connected to communicate with the various vehicle systems 940 and/or individual components thereof. For example, the one or more processors 910 and/or the one or more automated driving modules 960 can be in communication to send and/or receive information from the various vehicle systems 940 to control the movement, speed, maneuvering, heading, direction, etc. of the vehicle 900. The one or more processors 910 and/or the one or more automated driving modules 960 may control some or all of these vehicle systems 940 and, thus, may be partially or fully automated.

The one or more processors 910 and/or the one or more automated driving modules 960 may be operable to control the navigation and/or maneuvering of the vehicle 900 by controlling one or more of the vehicle systems 940 and/or components thereof. For example, when operating in an automated mode, the one or more processors 910 and/or the one or more automated driving modules 960 can control the direction and/or speed of the vehicle 900. The one or more processors 910 and/or the one or more automated driving modules 960 can cause the vehicle 900 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 970 can include one or more receivers 971 and/or one or more transmitters 972. The communications system 970 can receive and transmit one or more messages through one or more wireless communications channels. For example, the one or more wireless communications channels can be in accordance with the Institute of Electrical and Electronics Engineers (IEEE) 802.11 p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 970 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 310 (illustrated in FIG. 3) can be realized by the communications system 970.

Moreover, the one or more processors 910, the one or more data stores 915, and the communications system 970 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 900 can include one or more modules, at least some of which are described herein. The modules can be implemented as computer-readable program code that, when executed by the one or more processors 910, implement one or more of the various processes described herein. One or more of the modules can be a component of the one or more processors 910. Alternatively or additionally, one or more of the modules can be executed on and/or distributed among other processing systems to which the one or more processors 910 can be operatively connected. The modules can include instructions (e.g., program logic) executable by the one or more processors 910. Alternatively or additionally, the one or more data store 915 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 900 can include one or more automated driving modules 960. The one or more automated driving modules 960 can be configured to receive data from the sensor system 920 and/or any other type of system capable of capturing information relating to the vehicle 900 and/or the external environment of the vehicle 900. In one or more arrangements, the one or more automated driving modules 960 can use such data to generate one or more driving scene models. The one or more automated driving modules 960 can determine position and velocity of the vehicle 900. The one or more automated driving modules 960 can determine the location of obstacles, obstacles, or other environmental features including traffic signs, trees, shrubs, neighboring vehicles, pedestrians, etc.

The one or more automated driving modules 960 can be configured to receive and/or determine location information for obstacles within the external environment of the vehicle 900 for use by the one or more processors 910 and/or one or more of the modules described herein to estimate position and orientation of the vehicle 900, vehicle position in global coordinates based on signals from a plurality of satellites, or any other data and/or signals that could be used to determine the current state of the vehicle 900 or determine the position of the vehicle 900 with respect to its environment for use in either creating a map or determining the position of the vehicle 900 in respect to map data.

The one or more automated driving modules 960 can be configured to determine one or more travel paths, current automated driving maneuvers for the vehicle 900, future automated driving maneuvers and/or modifications to current automated driving maneuvers based on data acquired by the sensor system 920, driving scene models, and/or data from any other suitable source such as determinations from the sensor data 919. As used herein, "driving maneuver" can refer to one or more actions that affect the movement of a vehicle. Examples of driving maneuvers include: accelerating, decelerating, braking, turning, moving in a lateral direction of the vehicle 900, changing travel lanes, merging into a travel lane, and/or reversing, just to name a few possibilities. The one or more automated driving modules 960 can be configured to implement determined driving maneuvers. The one or more automated driving modules 960 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 960 can be configured to execute various vehicle functions and/or to transmit data to, receive data from, interact with, and/or control the vehicle 900 or one or more systems thereof (e.g., one or more of vehicle systems 940). For example, functions and/or operations of an automotive navigation system can be realized by the one or more automated driving modules 960.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 2-4, 6, 7, 8A, 8B, and 9, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method, comprising:
  determining, by a processor of an ego vehicle in a first lane, an existence of a traffic condition that includes a difference, between an actual velocity of a vehicle in a second lane and an expected velocity, being greater than a threshold;
  causing, by the processor and in response to the existence, a communications device of the ego vehicle to communicate, to an upstream vehicle, information about the traffic condition; and
  causing, by the processor and in response to an absence of the existence, the communications device to refrain from communicating, to the upstream vehicle, the information.

2. The method of claim 1, further comprising:
  causing, by the processor and in response to the existence, the communications device to communicate, to a server of a traffic monitoring system, the information; and
  causing, by the processor and in response to the absence of the existence, the communications device to refrain from communicating, to the server, the information.

3. A non-transitory computer-readable medium for communicating a traffic condition to an upstream vehicle, the non-transitory computer-readable medium including instructions that, when executed by one or more processors disposed on an ego vehicle, cause the one or more processors to:
  determine, by the ego vehicle in a first lane, an existence of a traffic condition that includes a difference, between an actual velocity of a vehicle in a second lane and an expected velocity, being greater than a threshold;
  cause, in response to the existence, a communications device of the ego vehicle to communicate, to an upstream vehicle, information about the traffic condition; and
  cause, in response to an absence of the existence, the communications device to refrain from communicating, to the upstream vehicle, the information.

4. A system, comprising:
  a processor disposed on an ego vehicle; and
  a memory storing:
    a determination module including instructions that, when executed by the processor, cause the processor to determine, by the ego vehicle in a first lane, an existence of a traffic condition that includes a difference, between an actual velocity of a vehicle in a second lane and an expected velocity, being greater than a threshold; and
    a communications module including instructions that, when executed by the processor, cause the processor to:
      cause, in response to the existence, a communications device of the ego vehicle to communicate, to an upstream vehicle, information about the traffic condition; and
      cause, in response to an absence of the existence, the communications device to refrain from communicating, to the upstream vehicle, the information.

5. The system of claim 4, wherein the instructions to determine the existence of the traffic condition include instructions to:
  obtain information about the actual velocity of the vehicle in the second lane; and
  execute a pattern recognition process that, based on the information about the actual velocity, determines the existence of the traffic condition.

6. The system of claim 5, wherein the instructions to obtain the information about the actual velocity include instructions to receive, via the communications device and from at least one of the vehicle in the second lane or another source, the information about the actual velocity.

7. The system of claim 5, wherein the instructions to obtain the information about the actual velocity include instructions to:
  detect, by a sensor disposed on the ego vehicle, information about at least one state of the vehicle in the second lane; and
  determine, based on the information about the at least one state, the information about the actual velocity.

8. The system of claim 7, wherein the at least one state comprises at least one of at least one position of the vehicle in the second lane or at least one velocity of the vehicle in the second lane.

9. The system of claim 7, further comprising the sensor, wherein the sensor is configured to detect information from an object at a position that is along a first line, the first line being perpendicular to a second line, the second line being along a direction of movement of the ego vehicle.

10. The system of claim 7, further comprising the sensor, wherein the sensor comprises at least one of a camera, a lidar device, an ultrasonic ranging device, or an infrared ranging device.

11. The system of claim 5, wherein the pattern recognition process comprises at least one of being based on a traffic flow theory model or being a machine learning process.

12. The system of claim 5, wherein the instructions to execute the pattern recognition process include instructions to:
  determine a measure of a density of vehicles in a vicinity of the ego vehicle; and
  determine, based on the measure of the density and from a graph of vehicle flow versus vehicle density, the expected velocity of the vehicle in the second lane.

13. The system of claim 12, wherein the instructions to determine the measure of the density of the vehicles include instructions to:
  determine distances between pairs of vehicles in a set of vehicles in a vicinity of the ego vehicle; and
  calculate, based on the distances, the measure of the density of the vehicles.

14. The system of claim 13, wherein the instructions to determine the measure of the density of the vehicles further include instructions to detect, by a sensor disposed on the ego vehicle, a position of each vehicle in the set of vehicles.

15. The system of claim 13, wherein:
  each vehicle in a pair of vehicles, of the pairs of vehicles, is within a same lane as another vehicle in the pair of vehicles, and
  the instructions to calculate the measure of the density of the vehicles include instructions to:
    calculate an average of the distances between the pairs of vehicles in the set of vehicles; and
    calculate an inverse of the average.

16. The system of claim 4, wherein the determination module further includes instructions that, when executed by the processor, cause the processor to determine, in response to the existence of the traffic condition, a position of the vehicle in the second lane associated with the traffic condition.

17. The system of claim 16, wherein the determination module further includes instructions that, when executed by the processor, cause the processor to determine, in response to the existence of the traffic condition, if the vehicle in the second lane is a back vehicle, of vehicles associated with the traffic condition, or a front vehicle of the vehicles associated with the traffic condition.

18. The system of claim 17, wherein the instructions to determine if the vehicle in the second lane is the back vehicle or the front vehicle include instructions to:
  determine a change, with respect to time, of the expected velocity of the vehicle in the second lane;
  determine that the vehicle in the second lane is the back vehicle in response to a determination that the change is a decrease of the expected velocity; and
  determine that the vehicle in the second lane is the front vehicle in response to a determination that the change is an increase of the expected velocity.

19. The system of claim 16, wherein the memory further stores a prediction module including instructions that, when executed by the processor, cause the processor to:
  produce, in response to the existence of the traffic condition, a prediction of the position, at a particular time, of the vehicle in the second lane;
  obtain, in response to the existence of the traffic condition, information about an actual position, at the particular time, of the vehicle in the second lane; and
  calculate, in response to the existence of the traffic condition, an error of the prediction, the error of the prediction being a difference between the actual position and the prediction of the position.

20. The system of claim 19, wherein:
  the prediction module further includes instructions that, when executed by the processor, cause the processor to determine, in response to the existence of the traffic condition, if the error of the prediction is greater than a threshold error; and
  the communications module further includes instructions that, when executed by the processor, cause the processor to cause, in response to the existence of the traffic condition and in response to a determination that the error of the prediction is greater than the threshold error, the communications device to communicate, to a server of a traffic monitoring system, information that indicates that the error of the prediction is greater than the threshold error.

* * * * *